United States Patent [19]

Marass

[11] Patent Number: 4,570,917
[45] Date of Patent: Feb. 18, 1986

[54] SHEET FEEDER FOR A SHEET PROCESSING MACHINE HAVING A CONTINUOUSLY RUNNING SHEET INTAKE

[75] Inventor: Josef Marass, Seehausen, Fed. Rep. of Germany

[73] Assignee: Georg Spiess GmbH, Gersthofen, Fed. Rep. of Germany

[21] Appl. No.: 685,156

[22] Filed: Dec. 21, 1984

[30] Foreign Application Priority Data

Jan. 19, 1984 [DE] Fed. Rep. of Germany ....... 3401819

[51] Int. Cl.⁴ .............................................. B42B 1/02
[52] U.S. Cl. ...................................... 270/53; 156/384; 156/542; 493/54; 493/380
[58] Field of Search .................. 270/53; 156/384, 542, 156/387, 297; 493/187, 210, 53–55, 379–381

[56] References Cited

U.S. PATENT DOCUMENTS

| | | | |
|---|---|---|---|
| 2,254,217 | 9/1941 | Grupe | 493/380 X |
| 2,289,336 | 7/1942 | Bamford | 493/380 X |
| 2,291,841 | 8/1942 | Staude | 493/380 X |
| 2,662,452 | 12/1953 | Sidebotham | 493/54 |
| 2,691,327 | 10/1954 | Hawley | 493/380 |
| 2,725,798 | 12/1955 | Vogt | 493/380 |
| 3,547,013 | 12/1970 | Gentry | 493/479 X |
| 4,505,467 | 3/1985 | Brocklehurst | 270/53 |

FOREIGN PATENT DOCUMENTS

| | | | |
|---|---|---|---|
| 2640497 | 3/1977 | Fed. Rep. of Germany | 270/53 |
| 21921 | 2/1977 | Japan | 270/53 |
| 155577 | 12/1979 | Japan | 270/53 |

*Primary Examiner*—E. H. Eickholt
*Attorney, Agent, or Firm*—Collard, Roe & Galgano

[57] ABSTRACT

The invention relates to a sheet feeding apparatus for supplying a sheet fed processing machine having a continuously running intake with successive sheets, preferably without any gaps between their leading and trailing edges and comprising retractable front sheet guides for halting the sheets and sheet advancing means adapted to operate in step with the feeding operation, said advancing means being driven from a one-turn shaft, that times the feed operation and drives the advancing means through a transmission responsible for advancing or retarding the sheets in relation to the rotation of the one-turn shaft as a function of the size of the sheets, said transmission having an output shaft moving in steps. In order to make it possible for the processing machine to be supplied with two superposed sheets at a time the apparatus comprises two superposed sheet advancing means operating in step and having superposed front sheet guides and able to be moved in step and at the same speed. At least one advancing means has two sets of sheetpulls (which will primarily be suckers) adapted to engage the sheet alined therewith on one side thereof, said sheetpull sets being offset from each other across the apparatus and being driven backwards and forwards 180° out of phase with each other by means of racks guided in the direction of transport and acting on the sheetpulls. The racks of one such set mesh with gear wheels keyed on a first shaft while those of the other mesh with gears bearinged on said first shaft and in mesh with gears keyed on a second shaft, parallel to the first shaft. There is a coupling for connecting the one or the other of the two shafts with the output shaft of the transmission alternately so that by virtue of a non-reversing connection between the shafts, they alternately turn in opposite directions.

19 Claims, 2 Drawing Figures

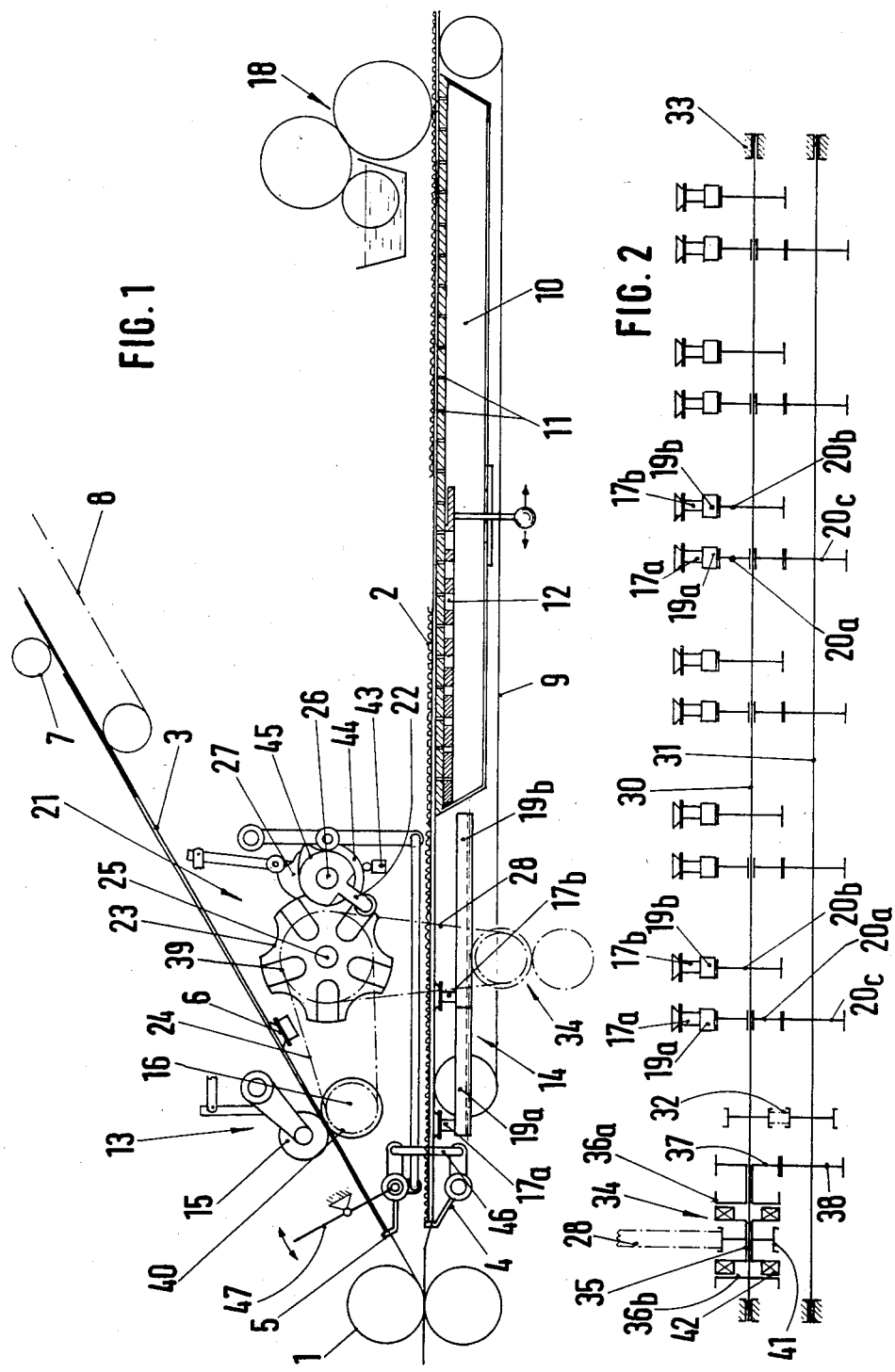

SHEET FEEDER FOR A SHEET PROCESSING MACHINE HAVING A CONTINUOUSLY RUNNING SHEET INTAKE

BACKGROUND OF THE INVENTION

The present invention relates to a sheet feeding apparatus for supplying a sheet fed processing machine having a continuously running intake with successive sheets, preferably without any gaps between their leading and trailing edges. More specifically, the invention relates to such a feeder comprising retractable front sheet guides for halting the sheets and sheet advancing means adapted to operate in step with the feeding operation, said advancing means being driven from a one-turn shaft, that times the feed operation and drives the advancing means through a transmission responsible for advancing or retarding the sheets in relation to the rotation of the one-turn shaft as a function of the size of the sheets, said transmission having an output shaft moving in steps.

DISCUSSION OF THE PRIOR ART

An apparatus designed on these lines is to be seen in the U.S. Pat. No. 4,502,678. Although this apparatus has come to be accepted in areas in which the processing machine is to be supplied with one sheet at a time, its not able to be used in areas in which the processing machine is to be supplied with two sheets at once that are placed on top of each other. However, such supply of the sheets is necessary when for example it comes to supplying a laminating machine for covering corrugated board sheets, which are not able to be printed, with coating sheets or the like which are.

SHORT OVERVIEW OF THE INVENTION

Taking this as a starting point, one aim of the present invention is to so design an apparatus of the sort noted initially that the machine may be supplied with two sheets at a time that are superposed.

In order to effect this and other objects of the invention that will appear from the following account, the apparatus comprises two superposed sheet advancing means operating in step and having superposed front sheet guides and able to be moved in step and at the same speed. At least one advancing means has two sets of sheetpulls (which will primarily be suckers) adapted to engage the sheet alined therewith on one side thereof, said sheetpull sets being offset from each other across the apparatus and being driven backwards and forwards 180° out of phase with each other by means of racks guided in the direction of transport and acting on the sheetpulls. The racks of one such set mesh with gear wheels keyed on a first shaft while those of the other mesh with gears bearinged on the said first shaft and in mesh with gears keyed on a second shaft, parallel to the first shaft. There is a coupling for connecting the one or the other of the two shafts with the output shaft of the transmission alternately so that by virtue of a non-reversing connection between the shafts, they alternately turn in opposite directions.

The use of these measures represents an advantageous way of supplying the processing machine at the desired rate and in step with successive sheets that are to be placed on top of each other, the top one or the bottom one in each case being only held by means acting only on one side thereof so that it is considerably simpler to coat it with glue. The use of the racks in the form of driving elements for the sheetpulls acting one one sheet side is in this respect responsible for moving the sheets exactly linearly with only one component of motion, something that makes it much easier to make sure of keeping to the same final speed in the vicinity of the advancing means. The use of two parallel shafts for driving the racks means not only that there is a different drive in the two sets of racks with and without an intermediate wheel and with and without a reversal in the direction of motion so that the sets move in opposite direction, but furthermore means that there is the useful effect of a very compact and simple structure. The driving of the two shafts at the same time makes certain in this respect that the opposite motion of the two sets of racks may be produced by the shortest or most compact route. The reciprocating motion of the racks is produced by alternatively causing the drive to act on one and then on the other of the two shafts in the opposite direction, said shafts being coupled together by a belt or equivalent so that they turn in the same direction, in which respect the distance between the shafts, that may be bridged over by pairs of gears, leads to the useful effect that the desired reversal of motion may be produced automatically. It will be seen from this that the invention attains its purpose in a very simple and compact way.

As part of a further development of the invention, in the case of shafts turning in the same direction, such shafts may be joined together drivingly by means of a chain or belt drive with a transmission ratio of 1 to 1. This feature makes possible a very even drive of the two shafts without any reversal in the direction of rotation.

In keeping with a further development of the present invention, the output shaft of the common transmission may be used to drive the middle part of a double coupling bearinged on one of the racking driving shafts, said double coupling being able to be engaged with one or the other of two coupling output parts, of which one is keyed on the shaft it is mounted on and the other is bearinged thereon and has a gear meshing with a gear wheel keyed on the other shaft. This design is responsible for a very simple and compact system for the alternative operation of one of the two shafts joined together so as to rotate successively in opposite directions.

A further beneficial effect of the invention is produced if the shafts cooperating with the racks stretch over the full width of the machine and if each sheetpull set is made up of a number of sheetpulls distributed over the width of the apparatus, each such sheetpull having its own driving rack. This design not only represents a very simple way of supporting the two shafts in the side frames of the apparatus, but furthermore makes certain of a reliable forwarding of the sheets by the sheetpulls.

The sheetpulls may with advantage be designed in the form of jumping sheetpulls put under vacuum in timed succession within a recurrent working cycle. The use of jumping sheetpulls leads to a reliable handling of the stiff corrugated material without leaving marks thereon.

The switching over of the double coupling for the two shafts can preferably take place in the intervals between two successive steps of the driving shaft, moved in steps, of the transmission. This is responsible for very smooth running so that there is the useful effect of a low wear rate and a resulting long working life of the apparatus with a high degree of accuracy in operation.

A part of a further useful development of the invention, the superposed front sheet guides may ganged together for common swinging motion. This leads to an exactly simultaneous actuation of the front guides that are placed over each other.

The actuation of the front guides, of the sheetpulls and of the double coupling may with advantage be produced by respective cams therefor that are placed on the output shaft, moved in steps, connected with the input side of the transmission. The outcome of this is that the apparatus automatically keeps in step whatever its speed of operation, or putting it differently, a variation in the speed will not cause readjustment of the control system to be necessary.

Within the compass of a further possible outgrowth of the invention, the upper advancing means may be fitted with an advancing roll, cooperating with pinch rolls, and the lower advancing means may be equipped with sheetpulls acting on one side of the sheets. The useful effect then produced is that the arrangement is highly convenient for the covering of an unprinted sheet by a printed one, since the lower sheet to be covered may be coated with glue on its top face without the elements of the advancing means coming into contact therewith.

Further useful outgrowths and beneficial features of the invention will be seen from the account now to be given of one preferred working example of thereof using the figures and in conjunction with the claims.

LIST OF THE FIGURES OF THE DRAWINGS

FIG. 1 is a diagrammatic side view of the sheet feeder apparatus in keeping with the present invention.

FIG. 2 is a diagrammatic front view of the lower advancing means operating with sheetpulls, as part of the arrangement of FIG. 1.

DETAILED ACCOUNT OF WORKING EXAMPLE OF THE INVENTION

The sheet feeder apparatus to be seen in FIG. 1 serves to supply a laminating machine, of which only the intake rolls 1 are to be seen, with successive sheets 2 of corrugated board, such sheets being covered in the laminating machine with a printed sheet 3, that for its part may be covered with a foil if needed, so as to form a laminate. The feeder apparatus has synchronously operating feed means whose front guides 4 and 5 are placed in the inlet side of the intake rolls 1 of the laminating machine. Such sheet guides 4 and 5 have the function of momentarily halting the sheets 2 and 3 momentarily before they are handed over to the intake rolls 1 so that the leading edges of the sheets may be lined up. Furthermore there may be a sideways alinement of the sheets by way of a side guide 6. The sheets 2 of corrugated board and the paper sheets 3 are taken by a separating device, not shown here, as for example one in the form of a suction head, from a pile of sheets before being removed by suitable advancing parts and run to their respective front guides 4 and 5 in the two cases. The advancing parts for use with the paper sheet 3 may be in the form of feed belts 8 cooperating with pinch rolls 7, such belts running over the feed board. To form the feed parts for feeding the sheets 2 of corrugated board, there are perforated suction belts 9, that run over a vacuum plenum 10, whose upper wall on which the belts run is made with perforations 11 as well. The vacuum plenum 10 is so designed that the sheets 2 of corrugated board are sucked upon until they get to their front guides 4. To keep the sheet from being buckled when it gets as far as its front guides 4, the suction power in the front part of the vacuum plenum is adjustable. This is made possible by having a manually operated slide 12 to enable the perforations 11 to be partly or completely shut.

In each working cycle, that is to say, on each rotation of of the one-turn shaft driving the feed means, one sheet may be transported whatever the size thereof. The intake rolls 1 of the laminating machine on the other hand are run at a constant speed so that over a given time the same length of sheet will be drawn in. In order to avoid having gaps between the leading and trailing edges of the successive sheets and in order thereore to make the best use of plant capacity and furthermore in order to prevent soiling of the pinch rolls of the laminating machine if the paper sheets 3, that are supplied from above, are covered with further sheets, the one-turn shaft dictating the cycle length of the feeding operation has to be run at a higher speed when processing short than when processing long sheets. On the other hand however, the transfer of the sheet to the intake rolls 1 is in every case to take place at the speed of the intake rolls 1. To make sure that this is so, there are superposed advancing means 13 and 14 for use with the front guides 4 and 5, such advancing means being designed to be driven or put into operation in step with the progress of the feeding operation and in this respect they are so driven that the sheet engaged thereby is handed over to the intake rolls 1 at the same speed as the rolls whatever the respective size of the sheets.

The upper advancing means 13 for use with the paper sheets 3 comprises an advancing roll 16 stretching over the full width of the apparatus and having pinch rolls 15 cooperating therewith. The lower advancing means 14 for the feed of the corrugated sheets 2, is equipped with two sets of linearly reciprocating sheetpulls only engaging the lower face of the respective sheet and which in the present example of the invention are designed in the form of a suckers 17a and 17b, that are put into operation during their forward strokes, that is to say connected with the vacuum. During the return stroke they are turned off. The corrugated board sheet 2 engaged only on its lower face by the suckers 17a and 17b may be glued on its top face. To coat the sheets with glue, there is a glue coating means 18 at the back end of and above the suction belts 9, the sheets 2 of corrugated board being pulled past the application roll of the coating means 18 by the suction belts 9. The suckers 17a and 17b are designed in the form of so-called jumping suckers, viz. suckers that spring forwards when put under vacuum to engage the board reliably even if it is in the form of corrugated, stiff sheeting. The suckers 17a and 17b are, as may best be seen from FIG. 2, distributed over the width of the apparatus, something that makes possible efficiently alined feeding of the sheets engaged by the suckers. The arrangement is in this respect so constructed that, as seen across the breadth of the apparatus, there are a number of pairs of suckers in each case made up of one sucker 17a and 17b of each of the two sucker sets. The suckers 17a and 17b are respectively mounted on one rack of the two sets of racks 19a and 19b guided on the same level for motion in the direction of feed, such racks cooperating with respective gear wheels 20a and 20b in the two cases.

The drive of the feed roll 16 and of the racks 19a and 19b is by way of the one-turn shaft which times the feed operation and is not shown in the figures, There is a transmission 21 to produce an advance and a retard in relation to the one-turn shaft, that is to say a change in speed so as to be greater or less than the speed of the one-turn shaft, such transmission comprising in the present case a locking arm geneva mechanism with a driving element 22 and an output or geneva member 23 or geneva wheel moved in step. The mechanism is driven by a variable speed drive that is not illustrated. In this way the speed of the driving element 22 of the mechanism may be varied in part of its rotary motion in relation to the speed of the one-turn shaft. The advancing roll 16 of the upper advancing means 13 is drivingly connected with the output shaft 25 of the transmission 21 on which the intermittently moving member 23 of the geneva mechanism is mounted, by way of a chain or belt drive 24. The actuation of the pinch rolls 15 is by way of a cam 27 mounted on the shaft 26 of the input member 22 of the geneva mechanism, such cam 27 having a suitable follower. The lower advancing means 14 is also driven by way of a belt or chain drive 28 from the output shaft 25 of the transmission 21. It would furthermore be possible for the drive of the lower advancing means 14 to be taken from the advancing rolls 16 (that for its part is driven by the driving or output shaft 25) of the upper advancing means 13.

Under the racks 19a and 19b that are used for driving the suckers 17a and 17b and which are placed at the same level, there are, see FIG. 2, two parallel shafts 30 and 31 placed one under the other and stretching right over the width of the apparatus so as to be normal to the racks 19a and 19b. Such shafts are joined together by a belt or chain drive 32 with a ratio of 1 to 1 so that they turn in the same direction. The two superposed shafts 30 and 31 have their ends mounted in bearings in the side frames 33 of the apparatus. On the top shaft 30 there are coaxial wheels 20a and 20b meshing with the racks 19a and 19b respectively. The gear wheels meshing with the racks 19b acting on the sucker 17b of one set of suckers are in this arrangement keyed on the upper shaft 30. The gear wheels 20a in mesh with the racks 19a driving the other sucker set are on the other hand bearinged on the top shaft 30 and are in mesh with respective gear wheels 20c keyed on the lower shaft 31. The racks 19a are accordingly driven by the pairs of gear wheels 20a and 20c driven from the lower shaft 31. The racks 19b are directly driven from the upper shaft 30 by way of the gear wheels 20b keyed on the shaft 30. Since the two shafts 30 and 31 are connected together drivingly by means of the belt or chain drive 32, when one of the shafts 30 or 31 is acted upon by a driving force, all the racks 19a and 19b will be moved at the same time, one set of racks being driven by the gear wheels keyed on the top shaft while the other racks in the other set will be driven by the gear wheels 20b bearinged on the top shaft and driven by the gear wheels 20c keyed on the lower shaft 31. As a result the two sets of suckers 17a on the one hand and 17b on the other will be moved in opposite directions and their working cycles will be 180° out of phase. The gear wheels 20a, 20b and 20c have the same size of pitch diameter so that they all run at the same speed.

In succeeding cycles the two shafts 30 and 31 are alternatively coupled with the output shaft 25 of the transmission 21. To do this there is a double coupling 34 or clutch having a driven middle member 35 able to have one or other of two output members 36a and 36b slide into engagement with it. The middle member 35 of the double coupling 34 is drivingly connected with the output shaft 25 of the transmission 21 by means of the belt or chain drive 28 connected with the lower advancing means 14. The middle member 35 is able to turn freely on the top of the two shafts 30 and 31 serving for driving the racks. The output members 36a and 36b are placed coaxially in relation to the middle member 35 and also mounted on the shaft 30, the left hand driven member 36b being keyed thereon and the other driven member 36a is bearinged thereon. This driven member 36a freely turning on the shaft 30 has gear teeth 37 so as to mesh with a driving gear wheel 38 keyed on the lower shaft 31. If the driven middle member 35 is in engagement with the output member 36b keyed on the top shaft 30, the top shaft 30 will be driven. If the middle member 35 is on the other hand engaged with the output member 36 bearinged on the top shaft 30, the lower shaft will be turned by way of the gear teeth 37 on the member 36b meshing with the driving gear wheel 38 keyed on the lower shaft 31, and because there is transmission by way of meshing gears rather than by a belt drive or the like, there will be a reversal of the direction of rotation. The gear teeth 37 and the gear wheel 38 have the same pitch diameter as the pitch diameter of the gear wheels 20a to 20c so that in this case as well there will be transmission ratio of 1 to 1, this in turn resulting in the same speeds of revolution, whichever of the two shafts 30 and 31 is the driven one. In order to produce the same speed of advance of the upper advancing means 13 and of the lower advancing means 14, it is necessary to see that there is the same overall transmission ratio. This is achieved simply in the present working example inasfar as, having the same output shaft gear wheels 39 for the belt or chain drives 24 and 28, the diameter of the driving wheel 40 of the advancing roll 16 is equal to the diameter of the driving wheel 41 of the middle member 35 of the double coupling 34 and the diameter of the advancing roll 16 and the diameter of the advancing roll 16 is the same as the pitch diameter of the gear wheels 20a to 20c or 37 and 38.

The double coupling 34 is in the form of a magnetic clutch whose magnets 42 are turned on and off by switches 43 therefor, that are operated by their own driving cams 44 mounted on the shaft 26 of the rotating member 22 of the geneva mechanism of the transmission 21. The cams are in this respect so designed that the switching of the double coupling 34 takes place while the shafts 30 and 31 are stationary, that is to say, between two successive steps of the geneva wheel 23. On each turn of the one-turn wheel of the feed means, i.e. during every stroke of the feed operation, one of the sets of suckers is moved in the feed direction and the suckers in the other set are moved back into the starting position. The suckers 17a and 17b that are responsible for feed, belong to the sucker set moved in the feed direction and put under vacuum during the feed stroke. The switching on and off of the vacuum to the suckers may be undertaken by the cam 27 used for control of the pinch rolls 15 or by means of a separate cam placed parallel thereto.

The front sheet guides 4 and 5 are pivotally mounted and are retracted shortly prior to the operation or start of operation of the respective advancing means 13 and 14 out of the feed plane. The operation of the sheet guides 4 and 5 is by means of a cam also mounted on the shaft 26 of the rotating member 22 and a pivoting follower system cooperating therewith. The two sheet guides 4 and 5 may, if desired, be operated by a separate cam and a separate pivoting lever system cooperating therewith. In the present working example the top and the lower sheet guides are however ganged together by a rod 46 acting on angled parts so that one may be certain of a precise synchronous actuation of the lower and of the upper sheet guides 4 and 5, while at the same time only the one common cam 45 is needed. The axes of rotation of the sheet guides 4 and 5 may be fixed, it being best to have them at an equal distance from the intake nip formed by the intake rolls 1. In the present example however the axle of the top front paper guides 5 is placed on an adjustable lever 47 so that the distance between the top front guides 5 and the intake rolls 1 may be changed independently of the distance between the intake rolls and the lower guides 4, this making it possible to produce an overhang at the leading edge of the paper sheet 3 and of the corrugated board sheet 2 in the finished product, something that is a welcome feature in many applications.

I claim:

1. In a sheet feeding apparatus adapted for supplying a sheet fed processing machine having a continuously running intake with successive sheets, said apparatus comprising:

retractable front sheet guide means for momentarily halting the sheets, sheet advancing means adapted to accelerate said sheets in step with the feeding operations, drive means including an intermittently acting one-turn shaft, said advancing means being driven from said one-turn shaft, said one-turn shaft timing successive feed operations as performed by said apparatus a transmission driven by said one-turn shaft and responsible for advancing and retarding the sheets in relation to and during the rotation of the one-turn shaft as a function of the size of the sheets, said transmission including an output shaft moving in steps to drive said advancing means, the invention residing in that said apparatus further comprises:

two superposed sheet feeding means adapted to operate in step and to advance sheets at instantaneously equal speed, each such sheet feeding means including one such sheet advancing means and such front sheet guide means placed after respective ones of such advancing means in the direction of sheet advance, said guide means of one sheet feeding means being located over said guide means of said other feeding means, at least one advancing means including two sets of linearly acting sheet propelling means adapted to engage a sheet one side thereof and feed same said propelling means in one set being spaced in a direction normal to the direction of sheet advance from propelling means in said other set, two sets of racks for driving respective ones of said sets of means in said advancing direction reciprocatingly and substantially 180° out of phase with respect to each other first and second shafts that are parallel to each other first gear wheels keyed on said first shaft, second gear wheels bearinged on said second shaft and meshing with said first gear wheels and with racks in one set thereof, third gear wheels keyed on said second shaft and meshing with racks in the other set thereof, a driving connection between said shafts to drive one from the other in the same direction of rotation, and alternate coupling and reversing means for driving one of said shafts directly and the other shaft with a reversing effect.

2. The apparatus as claimed in claim 1 wherein said driving connection has a velocity ratio of 1 to 1.

3. The apparatus as claimed in claim 1 wherein said coupling and reversing means comprises an input member and two output members on two sides thereof and able to be moved selectively into engagement therewith with a clutching effect, said input an two output members constituting a double clutch.

4. The apparatus as claimed in claim 3 wherein one of said output members is keyed on one of said shafts and the other output member is bearinged thereon and has gear teeth thereon, said apparatus further comprising a gear wheel on the other of said shafts to be driven by said gear teeth on said output member with a one to one velocity ratio.

5. The apparatus as claimed in claim 4 wherein said shafts are superposed and the upper one thereof has said input and output members are bearinged and keyed thereon respectively.

6. The apparatus as claimed in claim 1 wherein said shafts for driving said racks extend over the full width of the apparatus and each set of sheet propelling means comprises at least two such means, each being driven by a separate one of said racks.

7. The apparatus as claimed in claim 1 wherein said sheet propelling means are supported on the respective racks for driving them.

8. The apparatus as claimed in claim 1 comprising an intermittent vacuum actuation system, said sheet propelling means comprising jump sheetpulls adapted to be operated by said system cyclicly.

9. The apparatus as claimed in claim 1 comprising a cam mounted on said output shaft of said transmission and a cam follower switch means adapted to be operated thereby and to control operation of said sheet propelling means.

10. The apparatus as claimed in claim 3 wherein said double clutch is switched over between two steps of the said output shaft of the transmission.

11. The apparatus as claimed in claim 3 comprising a rotary shaft adapted to drive said intermittently turning output shaft of said transmission and a cam on said rotary shaft for controlling operation of said double clutch.

12. The apparatus as claimed in claim 10 wherein said double clutch is electromagnetically operated.

13. The apparatus as claimed in claim 1 comprising pivotal means ganging together the guide means of the one of said sheet feeding means with the guide means of the other thereof and cam means on said output shaft of said transmission for operation of said ganging means.

14. The apparatus as claimed in claim 1 wherein in at least one of said sheet feeding means the front guide means thereof is able to be adjusted in the direction of sheet feed.

15. The apparatus as claimed in claim 1 wherein said upper sheet feeding means comprises a fed roll and at least one pinch roll for operation therewith and said lower sheet feeding means comprises said linearly acting sheet propelling means.

16. The apparatus as claimed in claim 1 wherein said lower sheet feeding means comprises a perforated belt with vacuum supply means for moving said sheets to said lower sheet guides of said lower feeding means.

17. The apparatus as claimed in claim 15 comprising a vacuum plenum having an upper wall with perforations to support said perforated belt and a slide with perforations for shutting off perforations in said wall in a part thereof which is nearest said sheet guide means.

18. The apparatus as claimed in claim 1 comprising a glue application means adapted to supply glue to one side of the sheets to be fed by said sheet propelling means.

19. The apparatus as claimed in claim 1 comprising means to feed said sheets substantially free of gaps between leading and trailing edges thereof.

* * * * *